Jan. 19, 1965    M. J. KRAWACKI    3,166,019
ROTARY MOTION APPARATUS
Filed May 15, 1959    6 Sheets-Sheet 1

INVENTOR.
MICHAEL J. KRAWACKI

BY Drumbaugh, Free,
Graves & Donohue his   ATTORNEYS

Jan. 19, 1965   M. J. KRAWACKI   3,166,019
ROTARY MOTION APPARATUS
Filed May 15, 1959   6 Sheets-Sheet 2

INVENTOR.
MICHAEL J. KRAWACKI

BY Brumbaugh, Free,
Graves & Donohue
his   ATTORNEYS

Jan. 19, 1965  M. J. KRAWACKI  3,166,019
ROTARY MOTION APPARATUS
Filed May 15, 1959  6 Sheets-Sheet 3

INVENTOR.
MICHAEL J. KRAWACKI
BY Brumbaugh, Free,
Graves & Donohue
his ATTORNEYS

Jan. 19, 1965 M. J. KRAWACKI 3,166,019
ROTARY MOTION APPARATUS
Filed May 15, 1959 6 Sheets-Sheet 5

INVENTOR.
MICHAEL J. KRAWACKI
BY Brumbaugh, Free
Graves & Donohue
his ATTORNEYS

Jan. 19, 1965 M. J. KRAWACKI 3,166,019
ROTARY MOTION APPARATUS
Filed May 15, 1959 6 Sheets-Sheet 6

INVENTOR.
MICHAEL J. KRAWACKI
BY Brumbaugh, Free
Graves & Donohue
his ATTORNEYS

United States Patent Office 3,166,019
Patented Jan. 19, 1965

3,166,019
ROTARY MOTION APPARATUS
Michael J. Krawacki, Englishtown, N.J., assignor to Trojan Corporation, Plainfield, N.J., a corporation of New Jersey
Filed May 15, 1959, Ser. No. 813,592
11 Claims. (Cl. 103—139)

This invention relates generally to apparatus, such as fluid pumps and motors, in which there occurs an energy transfer between a mechanical part and a liquid or gaseous fluid. More particularly, this invention relates to apparatus of this sort which is characterized by aligned impulsion and rotary motion. The present application is a continuation-in-part of my erstwhile copending now abandoned application Serial No. 775,244 filed November 20, 1958.

By "aligned impulsion" is meant an energy transfer action between a mechanical part and a fluid wherein the fluid impels the part or is impelled thereby, and wherein the motion of the part is aligned in direction with the movement of the fluid in the course of the energy transfer action. Such alignment is present, for example, in a reciprocating steam engine wherein the motion of the piston is aligned with the direction of expansion of the steam in the cylinder. It is not present in turbo-pumps or turbo-motors wherein the motion of the rotating blades is at right angles to the direction of travel of the fluid contained within the pump or motor. Hence, in respect to the feature of aligned impulsion, the apparatus to which this invention relates is like reciprocating fluid pumps or engines, and unlike turbo-pumps or turbo-motors. However, the apparatus of the present invention is unlike reciprocating machines, and like turbo-pumps or turbo-motors, in that it is characterized by rotary motion. Hence, the apparatus to which this invention relates is rotary motion, aligned impulsion apparatus which combines in one machine the advantage found in reciprocating machines of the high efficiency which is provided by the aligned impulsion, and, also, the advantages found in turbo-machines (and which is provided by the rotary motion) of unidirectional continuous operation and of freedom both from mechanical vibration and from fluid vibration (pulsation).

The principal elements of one such rotary motion, aligned impulsion machine are shown schematically in the accompanying first two figures of the figures listed below wherein.

Figure 1:
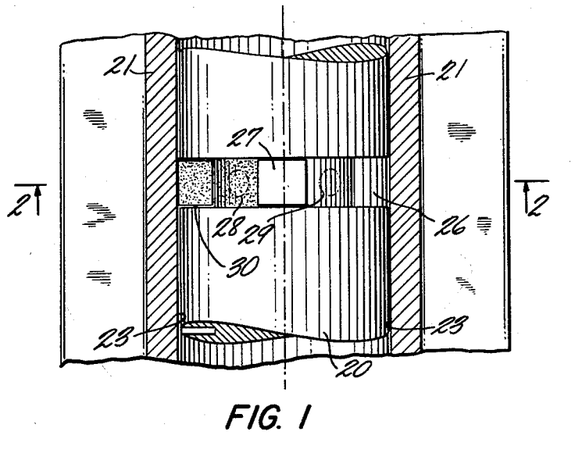
FIG. 1 is a partially cut away and plan view of apparatus according to the invention, as such apparatus may be generally represented.
Figure 2:
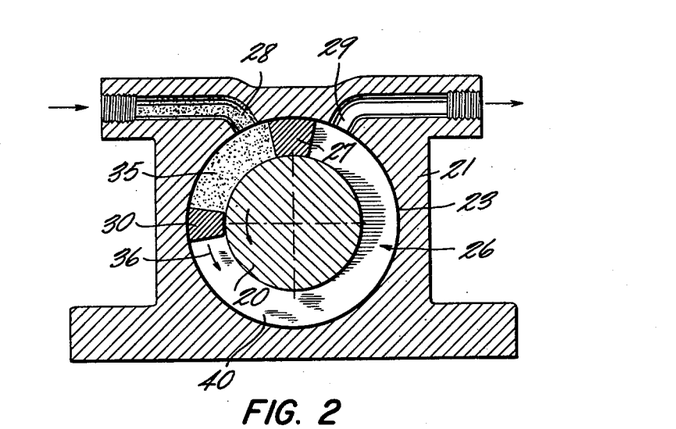
FIG. 2 is a vertical cross section, taken as indicated by the arrows 2—2 in FIG. 1, of such apparatus as it may be generally represented.

In FIGS. 1 and 2 which illustrate the general character of the type of apparatus to which this invention relates, the numbers 20 and 21 refer to a pair of relatively rotatable members in the respective forms of a drum and of a sleeve surrounding the drum.

The sleeve 21 is separated from the drum 20 by a clearance space 23. The clearance between drum and sleeve is selected to permit free relative rotation of these members while, at the same time, limiting, insofar as is practicable, the flow of fluid in the clearance space.

Other elements of the apparatus include a fluid-receiving groove 26 of any suitable cross section, a reaction block 27 seated in the groove to obstruct or impel flow of fluid therein, a high pressure port 28 opening into the groove 26 on one side of the block 27, a low pressure port 29 opening into the groove on the other side of the reaction block, and a vane or piston 30 of any suitable cross section which angularly rotates relative to the block 27. The vane 30 is normally disposed to obstruct or impel flow of fluid in the groove 26. However, as the vane 30 approaches the block 27 in the course of the relative angular movement therebetween, the vane undergoes an additional movement which is transverse to the said relative movement, but which may be axial or radial or part axial and part radial. The first half of this transverse movement momentarily displaces the vane 30 away from its normal groove-obstructing position so as to clear the reaction block 27. The second half of the transverse movement returns the vane 30 to its groove-obstructing position after the vane has passed by the reaction block. A means suitable to produce such transverse movement of the vane is not shown in FIGS. 1 and 2. However, examples of such means will be later described.

Each of the elements in FIGS. 1 and 2 may be one of several. The considered apparatus may include separately, or in any combination thereof, any one or more of the features of one or more annular fluid-receiving grooves, one or more reaction blocks in each groove, and any suitable number of vanes, of which one, some or all may operate either in only one groove or in more than one groove.

If there is more than one groove, the grooves may have differing depths and/or widths, i.e. be of different cross section. The transverse movement of the one or more vanes may be reciprocating, twisting, or oscillatory in character.

In the form of apparatus shown in FIGS. 1 and 2, the sleeve 21 is stationary, the drum 20 is rotatable about its axis, the annular groove 26 is formed in the drum 20, the ports 28 and 29 communicate with the groove 26 through the sleeve 21, the reaction block 27 is coupled in angularly fixed relation with the sleeve 21 to be stationary, and the vane 30 is coupled in angularly fixed relation with the drum 20 to rotate therewith. However, the present invention extends to other forms of apparatus. For example, the drum may be stationary and the sleeve rotatable, in which case the high and low pressure ports will pass through the stationary drum. While the block 27 and the vane 30 are always coupled with opposite ones of the members 20, 21, the block 27 may be coupled to the drum instead of the sleeve, and the vane 30 may be correspondingly coupled to the sleeve instead of the drum. The block 27 may be coupled to either the rotating or the non-rotating one of the members of the drum-sleeve combination. The transverse movement undergone by the vane to pass by the block is in the nature of a relative movement between block and vane, and hence may be produced either, as described, by having the vane transversely movable and the block transversely stationary in an absolute sense, or by having the vane transversely stationary and the block and groove transversely movable, or by having both the vane transversely movable and the block and groove transversely movable. As stated the mentioned transverse movement may be either radially directed or axially directed or part axially and part radially directed, i.e. be a motion which is resolvable into axial and radial components.

The apparatus shown in FIGS. 1 and 2 operates as follows as a motor. Gaseous or liquid fluid is introduced into and exhausted from the apparatus at relatively higher and lower pressures by way of the high and low pressure ports 28 and 29 which in this instance act respectively as the inlet port and as the outlet port. The high pressure fluid is represented in FIGS. 1 and 2 by stippling. This high pressure fluid flows from the inlet port 28 into a working chamber 35 whose bounding walls are formed by the annular groove 26, the portion of sleeve 21 which covers the groove, the reaction block 27, and the vane 30. Since the reaction block 27 is stationary and exerts a reactive force on the fluid, the fluid cannot flow angularly in the groove in the clockwise direction. However, since the vane 30 is movable, and since the pressure of the fluid exerts a force on the vane, the vane will be driven counterclockwise by the fluid. This counterclockwise rotation of vane 30 is represented in FIG. 2 by the arrow 36.

As the vane 30 moves counterclockwise, it causes exhaustion through the outlet port 29 of residual fluid in the chamber 40 which is bounded by the groove and sleeve and by the surfaces of the reaction block and vane which are angularly opposite the surfaces thereof which bound the working chamber 35. The vane 30 continues to be driven by the fluid in the working chamber 35 until the vane comes into angular registration with the outlet port 29. Thereupon, the fluid in the working chamber exhausts through the port 29.

Meanwhile, the vane is carried towards the reaction block by the angular momentum of the drum. As the vane approaches the block, the vane is caused to undergo (by means not shown in FIGS. 1 and 2) a first motion which displaces the vane transversely to a position where the vane will clear the block. When the vane has passed the block, it undergoes a second transverse motion which returns it to the normal position wherein the vane obstructs the groove. As the vane now moves away from the reaction block, the space opening in the groove between the block and vane is a space which provides a new working chamber for the high pressure fluid from inlet port 28. This high pressure fluid is received into the new working chamber, and the described cycle begins all over again.

The operation just described is the operation of a fluid motor because the apparatus is supplied with an input of fluid energy, this fluid energy is made available by a drop in the pressure of the fluid as it passes through the apparatus, and the apparatus translates such available fluid energy into mechanical energy which is manifested by the rotation of drum 20, and which may be extracted from the apparatus as an output thereof. Obviously, however, the described apparatus is also adapted to operate as a fluid pump either by reversing the high and low pressure fluid connections thereto, or by reversing the direction of rotation of the drum. When operating as a pump by virtue of a reversal in the direction of drum rotation, the ports 28 and 29 are connected as before to communicate respectively with high and low pressure points of the fluid system, but the low pressure port 29 becomes the inlet port, the high pressure port 28 becomes the outlet port, the direction of rotation of drum 20 is reversed, and an input of mechanical energy is supplied to rotate drum 20 and vane 30. Under such circumstances, the fluid will flow through the apparatus from port 29 to port 28. Also, the input of mechanical energy will be translated into increased fluid energy which is manifested by the increased pressure of the fluid at the outlet port 28 as compared to the pressure thereof at the inlet port 29.

It will be noted that the described apparatus when operating as a motor is bidirectional in the sense that the drum can equally well be rotated in either direction simply by reversing the fluid connections thereof to the external fluid system so that port 29 becomes the high pressure port and port 28 the low pressure port. Similarly the described apparatus when operating as a pump is bidirectional in that by reversing the fluid connections and, also, the direction of rotation of the drum, the direction in which the fluid is pumped can be reversed.

Rotary motion, aligned impulsion apparatus of the sort described is generally known to the art. Such prior art apparatus is, however, subject to numerous disadvantages, among which may be mentioned excessive friction and binding between parts, excessive wear of such parts, and excessive vibration. The defects just mentioned are caused primarily by the action on various parts in the machine of forces which are neither balanced, minimized to the practical limits, nor effectively counteracted. Such forces are, in general, produced by the pressure of the fluid in the machine, and will be proportional thereto. Moreover, such forces, in general increase about as the square of the speed of operation of the machine.

When the operating pressure is relatively low, and, also when the speed of operation is relatively low, the machines known to the prior art will be characterized by wear, friction and vibration to an extent which is undesirable. When the fluid pressure and/or the speed of operation are high, the prior art machines will be characterized by wear, friction and vibration to an extent which renders impractical the use of such machines in high pressure, high speed applications.

It is accordingly an object of the invention to provide rotary motion, aligned impulsion apparatus in which the above mentioned disadvantages of friction, wear and vibration are minimized under all pressure and/or speed conditions.

Another object of the invention is to provide apparatus of the stated sort which is well adapted for use in high speed, high pressure applications thereof.

Yet another object of the invention is to increase the efficiency of operation of rotary motion, aligned impulsion apparatus by increasing the work done per groove.

A still further object of the invention is to alleviate in rotary motion aligned impulsion apparatus the deleterious effects on one or more vanes thereof of unbalanced forces to which such one or more vanes may be subjected.

These and other objects are realized according to the invention by providing rotary motion, aligned impulsion apparatus characterized by one, some or all of the following features among others. First, the elements of the apparatus are arranged to provide radial and/or axial balance of the apparatus in respect to fluid pressure forces.

Second, means are provided in association with each vane unit of the apparatus to either balance the radial and/or axial fluid pressure force thereon or to counteract such force. Third, means are provided to render each vane angularly balanced in respect to fluid pressure forces when the vane undergoes a movement for the purpose of passing by a reaction block. Fourth, means are provided to avoid trapping of fluid between such vane and a reaction block in the course of such block-passing movement. Fifth, each vane unit is comprised of a plurality of vane segments which are independently movable to thereby reduce wear on the vane material and/or on the means employed to impart the described block passing movement to the vane unit. Other important features of the invention will later become apparent.

For a better understanding of the invention, reference is made to the following descriptions, the already described FIGS. 1 and 2 of the drawings, and to the remaining figures of the drawings.

Figure 3:
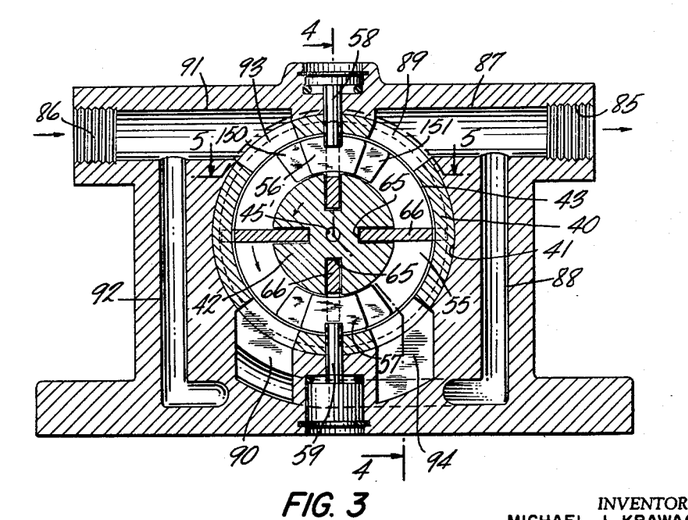
FIG. 3 is a front elevation in vertical cross section of a practical embodiment of the invention.
Figure 4:
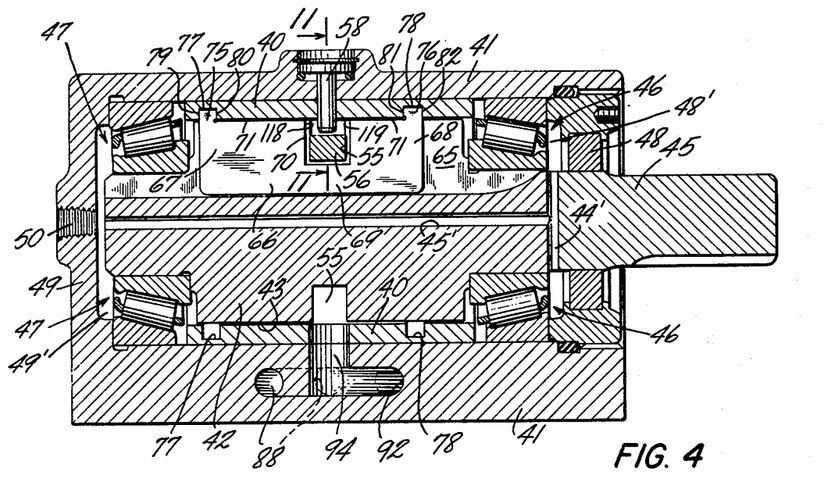
FIG. 4 is a side elevation in vertical cross section, taken as indicated by the arrows 4—4 in FIG. 3, of the embodiment shown in FIG. 3.

FIGS. 3 and 4 will first be considered. In the embodiment shown in these figures, a stationary bushing 40 is fitted within and secured to a cylindrical casing 41 for the apparatus. The inside surface of the bore of the casing and the outside surface of the bushing may have matching slight conical tapers to assure good metal to metal contact between casing and bushing when the latter is axially advanced under pressure into the bore of the former. If desired the bushing may have an axial slot running its entire length to permit adjustment of the inside diameter of the bushing (by adjustment of its axial position) in the bore of the casing to thereby compensate for wear.

The bushing surrounds and acts as a sleeve for a rotatable drum 42 which is separated from the bushing by an annular, axially extending clearance space 43. The inside surface of the bushing and the surface of the drum having matching slight conical tapers permitting adjustment of the amount of clearance therebetween by relative axial adjustment of the drum and the bushing. The clearance between drum and bushing is made as small as is consistent with free rotation of the former within the latter to thereby reduce to a minimum leakage of fluid through the clearance space.

The cylindrical drum 42 is on a shaft 45 (FIG. 4) which is mounted for free rotation within the casing 41 by a pair of axially separated bearing assemblies 46 and 47. At its right-hand end the shaft 45 passes out of the casing through a gland 48 adapted to act as a fluid seal. At its left-hand end the shaft 45 terminates short of the plate portion 49 of the casing 41 which closes off this end of the apparatus. Between the plate portion 49 and the end of the drum there is a space 49' defining a reservoir for collecting fluid which may find its way through the space 43 or through the slot 65 around the edges of the vanes 66. Similarly, at the other end of the machine there is another space or reservoir 48' in which fluid may collect. In order to equalize fluid pressure between the two reservoirs 48' and 49', an axial channel 45' with connecting radial conduits 44' are formed in the drum. In this way axial balance of forces on the vanes and the drum is maintained. A central aperture 50 in the plate portion 49 permits drainage from the apparatus of fluid which has leaked away from the operating zone thereof.

Such operating zone is provided by annular groove 55 which is axially of rectangular cross section, and which is formed as a recess in the drum 42. Within this groove 55 are seated in radially opposed relation a pair of reaction blocks 56 and 57. Those reaction blocks are maintained in angularly fixed relation with the bushing 40 by the pins 58 and 59. A further description will later be given of the details of construction of the reaction blocks themselves, and of the anchoring means for such reaction blocks.

Also formed in the drum 42 are four axial slots 65 (FIG. 3) disposed at 90° angular intervals about the drum. The slots 65 axially transect the groove 55 and are radially cut into the drum deeper than is the groove 55. Received within the slots 65 to be axially slidable therein are a corresponding number of vanes 66. As shown in FIG. 4, each vane 66 has two axially separated end portions 67, 68 and an axially central portion 69 of reduced radial size. The central portion is created in each vane by a rectangular recess or notch 70 which extends into the vane in the radial direction from the margin 71 of the vane which is nearest to the clearance space 43 between the drum 42 and the bushing 40. Each recess 70 has an axial and radial extent suitable to contain with clearance either of the reaction blocks 56, 57 when the vane is positioned as shown in FIG. 4. Therefore, when a vane is so positioned, the vane is adapted to pass by either reaction block as the rotation of the drum 42 causes the vanes to move angularly relative to the reaction blocks.

The normal position of the vanes 66 is not that shown in FIG. 4, but is, instead, a position in which the vane is displaced rightward of the position shown in FIG. 4 to dispose the leftward end portion 67 across the groove 55. When so disposed, the end portion 67 obstructs or impels the angular flow of fluid in the groove.

For the purpose of reciprocating each vane 66 back and forth between the working position at which it obstructs the groove and the position at which the vane will pass by the reaction blocks, each vane 66 is provided with a pair of cam follower projections 75 and 76 which ride in a corresponding pair of closed cam tracks 77, 78 formed in the bushing 40. The axially opposite vertical sides 79 and 80 of track 77, and the axially opposite, vertical sides 81 and 82 of track 78 are guiding surfaces against which the projections 75 and 76 bear to control the axial position of the vane 66 as it rotates relative to the bushing 40. If desired, both cam tracks may be made open to each provide one of two oppositely facing guide surfaces (e.g. surfaces 79, 82, surfaces 80, 81) or, alternatively, one cam track and associated cam projection may be dispensed with.

Figure 4A:
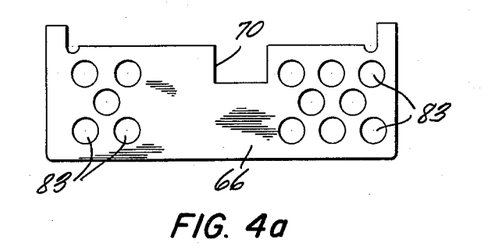
FIG. 4a is a view in side elevation of a modification of the vane shown in FIG. 4.
Figure 4B:
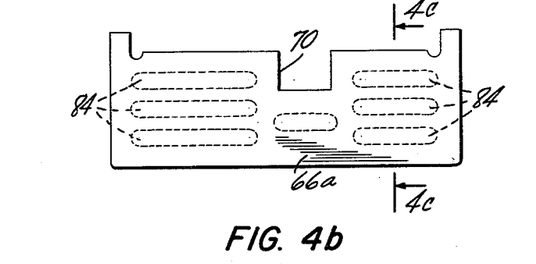
FIG. 4b is a view in side elevation of another modification of the vane shown in FIG. 4.
Figure 4C:
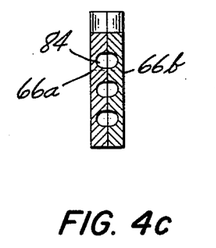
FIG. 4c is a cross sectional view, taken as indicated by the arrows 4c—4c in FIG. 4b, of the modified vane shown in that last-named figure.

It is desirable to reduce the mass of the vanes 66 in order that less force will be required to reciprocate them in the slots 65. This reduction in mass may be attained in various ways. For example, it may be attained, as shown in FIG. 4a, by providing lightening holes 83 in each vane 66. As another example, such reduction in mass may be attained, as shown in FIGS. 4b and 4c, by making the vane a composite structure of two separate vane sections 66a and 66b which are joined together along an axially and radially extending central plane, and by providing internal cavities 84 in such composite vane.

The described apparatus is as shown in FIG. 3 connected to a fluid system by the pipe 85 which is the high pressure pipe (or alternatively may be the low pressure pipe) and the pipe 86 which is the low pressure pipe (or, alternatively, may be the high pressure pipe). The pipe 85 branches into a pair of conduits 87 and 88 which respectively lead to a pair of radially opposed high pressure ports 89 and 90 opening through the casing 41 and bushing 40 into the fluid-receiving groove 55 in the drum 42. The pipe 86 similarly branches into a pair of conduits 91 and 92 which respectively lead to a pair of radially opposed low pressure ports 93 and 94 opening through the casing 41 and bushing 40 into the groove 55. Around the bushing 40, the distribution of ports is such that high pressure ports alternate with low pressure ports. Furthermore, the ports are distributed in relation to the reaction blocks so that each reaction block has one high pressure port and one low pressure port on opposite sides thereof and in closely spaced relation therewith. The connections of the high and low pressure ports to the external fluid system need not be by the conduit system shown but may be by any suitable conduit system. If desired, the "compounding" technique may be used, i.e.

one or more given outlet ports may be connected to supply fluid to one or more subsequent inlet ports.

Figure 5:
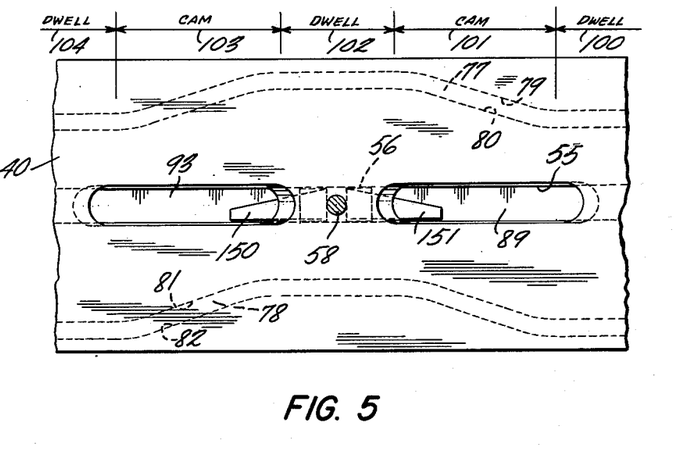
FIG. 5 is a developed plan view, taken over the angular interval indicated by the arrows 5—5 in FIG. 3, of the embodiment of FIG. 3.

FIG. 5 is a developed view of the angular interval around the bushing 40 which includes the reaction block 56, the ports 89 and 93, and the portions of the cam tracks 77 and 78 which extend over this angular interval. While the view in FIG. 5 is limited to the angular interval mentioned, the figure is generally illustrative of the space relations obtaining between each reaction block, the associated high and low pressure ports, and the angularly corresponding portions of the cam tracks. As shown in FIG. 5 the cam tracks 77 and 78 are from right to left divided into a dwell section 100, a cam section 101, a dwell section 102, another cam section 103 and another dwell section 104. The dwell section 102 is optional, and, if desired, can be eliminated by extending the cam sections 101 and 103 to meet each other, and to thereby form a rounded curve of continuously changing slope over the intervals 101, 102, 103. For reasons later explained, the angular extent occupied by port 89 spreads over the whole of cam section 101 and to either side thereof. Similarly, the angular extent occupied by port 93 spreads over the whole of cam section 103 and to either side thereof.

The shown dwell and cam sections of the cam tracks are adapted to control as follows the axial position of a vane which is rotating to be represented by a movement from right to left in the developed view of FIG. 5. When the vane is angularly positioned in the dwell section 100, the cam tracks 77 and 78 maintain the vane axially disposed at the normal position thereof in which the end portion 67 of the vane obstructs the groove 55 in the drum 42. As the vane moves into the cam section 101, the shown curvatures of cam tracks 77 and 78 impart to the vane an axial motion which displaces the vane away from its normal axial position, and which is to the left as seen in FIG. 4. This axial motion ceases when the vane reaches the dwell section 102. At this time, the vane is axially disposed in the position shown in FIG. 4. In this position, the end portion 67 has been displaced sufficiently leftward to be clear of the reaction block 56, and the recess 70 of the vane is in axial registration with the reaction block. The vane is maintained so disposed by the cam tracks 77, 78 over the extent of angular movement of the vane which is represented by the dwell section 102. While the vane is so disposed, the reaction block will pass with clearance through the recess 70 in the vane. Hence, in the course of its angular movement over the dwell section 102, the vane will freely pass by the reaction block.

When the vane reaches the cam section 103, the curvature of the cam tracks 77, 78 imparts to the vane a second axial motion which results at the end of the camming period in a return of the vane to its normal, groove obstructing position. The vane remains in this last-named position over the angular interval represented by the dwell section 104, and until such time as the vane is again given a new axial motion for the purpose of clearing the reaction block 57 which, as shown in FIG. 3, is displaced by 180° from the reaction block 56.

The cam track, in order to reciprocate the vanes, must contact the vanes to impart accelerating and decelerating forces thereto. Over a period of time such forces and the motions of the vanes will tend to produce substantial wear in the cam tracks and, also, on the vanes. Applicant has found, however, that this wear can be minimized by having the camming sections of the cam tracks conform to a curve for which, mathematically speaking, the first derivative is zero and, also, the second derivative is zero at both of the two points on the curve which respectively correspond to the beginning and end of the camming section. A curve having such slope characteristics can be readily derived by mathematical procedures known to the art.

From the description already given of the generalized form of apparatus shown in FIGS. 1 and 2, and from the foregoing description of the practical embodiment shown in FIGS. 3 and 4, the operation of the FIG. 3 and 4 embodiment should be obvious. If the vanes 66 are impelled by fluid which enters by the high pressure pipe 86 and leaves by the low pressure pipe 85, the drum 42 will rotate counterclockwise as seen in FIG. 3, and the apparatus will act as a motor. If, on the other hand, the vanes 66 impel fluid which enters by low pressure pipe 85 and which leaves by high pressure pipe 86, the drum 42 will be rotated clockwise, as seen in FIG. 3, to provide this impulsion action, and the apparatus will operate as a fluid pump. The apparatus can also be converted from a motor to a pump by employing the same counterclockwise direction of rotation as before of the drum but by reversing the fluid connections of pipes 85 and 86 so that 85 becomes the high pressure pipe and 86 becomes the low pressure pipe.

Figure 6:
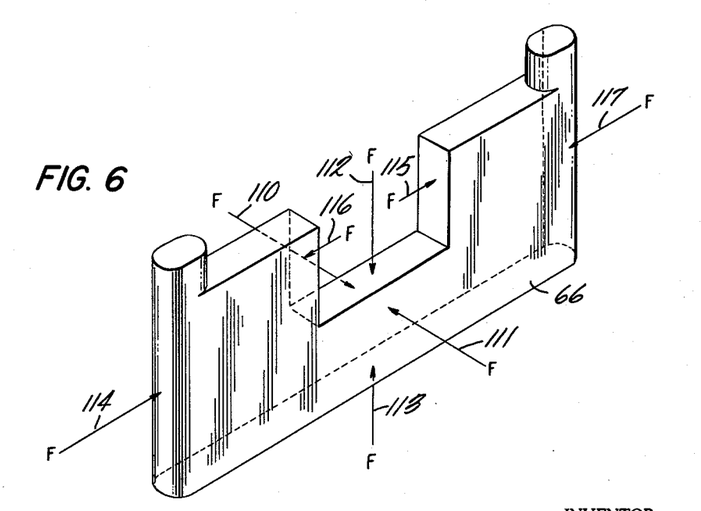
FIG. 6 is an isometric view showing in schematic form one of the vanes in the FIG. 3 embodiment, and the forces exerted on such vane.

As stated heretofore, one of the troublesome problems encountered in apparatus of the sort described is the problem of balancing or otherwise counteracting the fluid pressure forces which act on various mechanical parts. Ideally, such balance or counteraction should be attained in all three of the angular, radial and axial directions which characterize the machine. For a better understanding of what is meant by such balance or counteraction in all three directions, reference is made to FIG. 6 which shows in schematic form one of the vanes 66 of the described apparatus. As indicated by this figure, the represented vane 66 is subjected to leftwardly and rightwardly directed angular forces, represented by the arrows 110, 111; to upwardly and downwardly directed radial forces represented by the arrows 112, 113; and to leftwardly and rightwardly directed axial forces represented by the arrows 114, 115 for rightward forces, and by the arrows 116, 117 for leftward forces. Most of these forces are created by the pressure of the fluid in the apparatus. Consideration will now be given to the various ways in which the described apparatus balances or otherwise neutralizes those fluid pressure forces.

In the embodiment of FIGS. 3 and 4, the pressure of the fluid will act in axially opposite directions on the two side walls 118 and 119 of the groove 55 which is formed in the drum 42. Also, the pressure of the fluid will act with equal force in axially opposite directions on the two side walls of the recess 70 which is formed in each vane 66. The balance of forces on the remote end margins of the vanes by means of the passages 48' and 49' has been previously referred to. Therefore, both the drum 42 and the vanes 66 will be axially balanced in respect to fluid pressure forces.

Referring to FIGURE 3, the difference in value between the pressure of the fluid at high pressure ports 89, 90 and at low pressure ports 93, 94 is a pressure difference which could produce serious radial unbalance of the machine and of the rotatable member. For example, such serious radial unbalance would exist if there were present only one high pressure port and only one low pressure port. In the shown embodiment, however, this particular problem is overcome by providing at least two high pressure ports which are located at equally spaced angular intervals, at least two low pressure ports which are also located at equally spaced angular intervals, and at a least two reaction blocks which are seated at equally spaced angular intervals in the groove. By so providing equally spaced high pressure ports and equally spaced low pressure ports, the radial fluid pressure forces at the high pressure ports act equally and oppositely to cancel each other out. Similarly, the radial pressure forces at the low pressure ports act equally and oppositely to cancel each other out. Therefore, insofar as the ports are concerned, the machine and rotatable member are both balanced in respect to radial pressure forces.

In general this radial balance in respect to the ports may be secured for any number of paired inlet and outlet ports exceeding two pairs by following the technique of distributing the inlet ports at equal angular intervals about the groove, and by distributing the outlet ports at equal intervals about the groove in alternation with the inlet ports. For example, the rotor may be radially balanced in the instance where there are three inlet ports and three outlet ports by distributing the inlet ports at 120° intervals about the groove and by also distributing the three outlet ports at 120° intervals about the groove in alternation with the inlet ports. When the inlet and outlet ports are so distributed, radial balance is obtained at the rotor in respect to the fluid pressure forces at the ports because of the fact that such forces will act on the rotor with respective magnitudes and directions in the radial plane to satisfy the equations for static equilibrium of the rotor in the radial plane. In other words, the algebraic vector sum of all such forces on the rotor in the radial plane will be zero, and the algebraic sum of all moments on the rotor in the radial plane will also be equal to zero.

Where two or more inlet ports and two or more outlet ports communicate with a common groove, it is necessary, to attain radial balance, for the two associated reaction blocks to be seated in equally spaced angular relation in such groove. Furthermore, under such circumstances, it is necessary to have equiangularly distributed vanes of a number which is preferably at least twice the number of reaction blocks. This is shown in FIG. 3, wherein the four shown vanes are equiangularly distributed, and are twice the number of the two reaction blocks 56, 57. With the conditions just stated being met, an excellent radial balance of the machine is obtained.

In the apparatus, the vanes 66 are subjected to a fluid pressure force which acts in the radially inward direction. This force tends to press the vanes against the bottoms of the axial slots 65 to thereby render it difficult to reciprocate the vanes in the slots.

Figure 7:
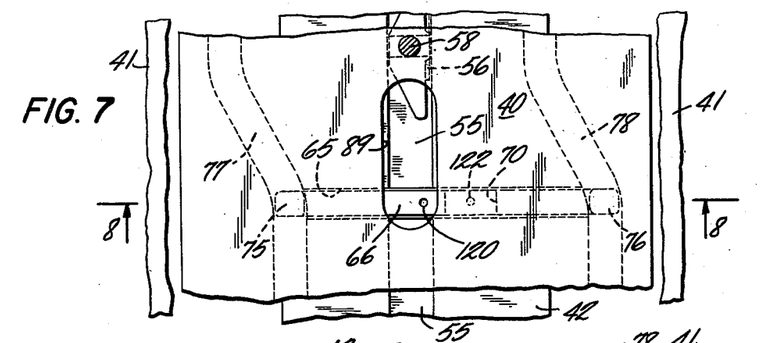
FIG. 7 is an enlarged plan view showing in detail a vane and the surroundings of such vane in the embodiment of FIG. 3, the said FIG. 7 also showing means for counteracting radial fluid pressure force exerted on such vane.
Figure 8:
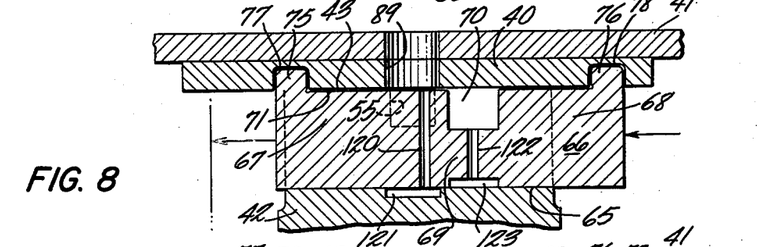
FIGS. 8–10 inclusive are successive views in time, and taken in vertical cross section as indicated by the arrows 8—8 in FIG. 7, of the vane and surroundings shown by FIG. 7.

The problem just mentioned is overcome in the presently described apparatus by providing means which counteracts such tendency of the pressure force exerted radially inward on the vanes. One form of such means is shown in plan view in FIG. 7 and in side elevation in FIGS. 8–10. As represented in those figures, the means comprises a small aperture 120 which passes through the shown vane 66, and which, as shown in FIG. 8, is located in the vane to register with any one of the ports opening into the groove 55 when the vane 66 is disposed in its normal, groove-obstructing position. When the vane is so disposed, the aperture 120 communicates with a cavity 121 which is formed in the bottom of the axial slot 65 containing the vane, and whose axial dimension is coextensive with that of the port whereby the area of the cavity which is projected onto the bottom of the vane is in registration with and of the same size as the area of the port which is projected onto the top of the vane. As a further feature, the vane 66 has formed therein a second aperture 122 which passes through the vane from the bottom of the rectangular recess 70 to another small recess 123 formed in the margin of vane 66 which is nearest the bottom of the containing slot 65. The recess 123 is axially coextensive with the bottom of recess 70, whereby the axially extending faces of both recesses are in registration and of the same size.

The apertures 120 and 122 together with cavity 121 and recess 123 serve as follows to counterbalance at each and every instant fluid pressure force exerted radially and inwardly on the vane. The angular movement of the vane will first bring it into registry with a high pressure port at a time when the vane is in the normal groove obstructing position shown in FIGURE 8. At this time, a small amount of fluid will pass from the high pressure port, through the aperture 120, into the cavity 121 which serves as a reservoir for high pressure fluid. When so located in this cavity the fluid will exert upon the vane a radial pressure force which is directed outwardly, and which, hence, opposes the inwardly directed radial force exerted on the vane by the fluid in the clearance space 43 between the vane and the bushing 40. In addition, a small part of the fluid in the cavity flows into the interstice between the vane and the bottom of the slot to serve as a lubricant to reduce the coefficient of friction between the vane and the bottom of the slot. The effect of both neutralization of the inward force on the vane and reduction of the coefficient of friction between the vane and the bottom of the slot is an effect which reduces markedly the friction force opposing axial motion of the vane.

Figure 9:
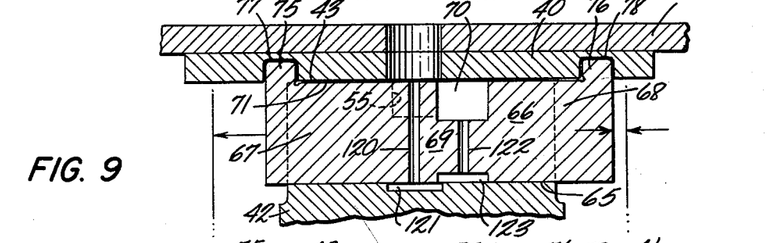
Figure 10:
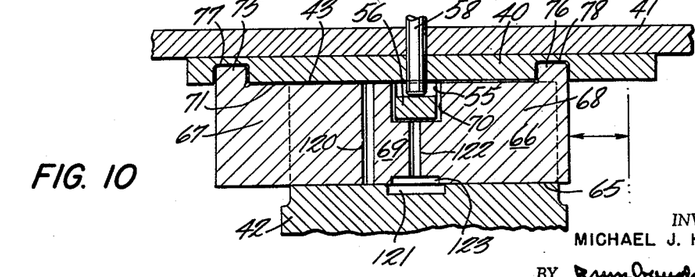

While the vane 66 is under the high pressure port, it begins to undergo the motion which is imparted thereto for the purpose of allowing the vane to pass by the reaction block. FIG. 9 shows the position instantaneously assumed by the vane just after the start of such axial motion. This motion is completed at a time when the vane has moved leftward, to the position shown in FIG. 10, where the recess 70 is in registration with the reaction block 56 to permit the block to pass through the recess, or, in other words, to permit the vane 66 to pass by the block in the course of the angular movement of the vane. At such time, the aperture 120 has been leftwardly displaced to the point where the aperture is out of registration with the cavity 121 in the bottom of the slot.

As the vane reciprocates to start to bring recess 70 into registration with the port 89 (FIG. 9) the pressure of the fluid from the port will be exerted not only over the area of the vane directly under the port, but also over the area of the axially extending face of recess 70. In the absence of the recess 123 formed in the vane, this inward pressure acting over both such top areas of the vane would be counteracted by an outward pressure acting over only that bottom area of the vane which is opposite cavity 121, and the inward and outward radial pressure forces on the vane would be unbalanced. However, because of the presence of recess 123 in the vane, the area over which fluid pressure is exerted on the bottom of the vane will match at each and every instant the area over which fluid pressure is exerted on the top of the vane, and, hence, the vane at all times will be balanced during its reciprocating movement in respect to the inward and outward radial forces exerted thereon. In this connection the apertures 120, 122 serve to perform a pressure equalizing function and, also, as stated, in the case of aperture 120, to permit a small amount of fluid to flow to the bottom of the slot to there act as a lubricant. Consonant, however, with the performance of such functions, the apertures 120, 122 should be made as small as possible to avoid a loss in efficiency.

In respect to pressure fluid forces which act in an angular direction on the vanes, such forces will always be unbalanced when the vanes are being effective to provide a motor action or a pumping action. This is so, since, when the described apparatus is being used as a motor, it is the presence of this unbalance which drives the vanes, and, since, when the apparatus is being used as a pump, the action of the vanes will produce this unbalance of angularly acting forces. Therefore, an unbalance of angular forces on the vanes is, in fact, desirable so long as the vanes remain stationary in their groove obstructing or working position. When, however, any vane is disposed in those angular intervals of its angular movement in which the vane is given either one of the reciprocal axial motions which displace the vane from its normal working position to its block-passing position, or which return the vane from its block-passing position to its normal working position, then an unbalance of angularly directed fluid pressure forces becomes undesirable. The reason for this is that any such unbalance tends to press the vane against one of the walls of its containing slot to thereby make it more difficult to reciprocate the vane in the slot.

Figure 11:
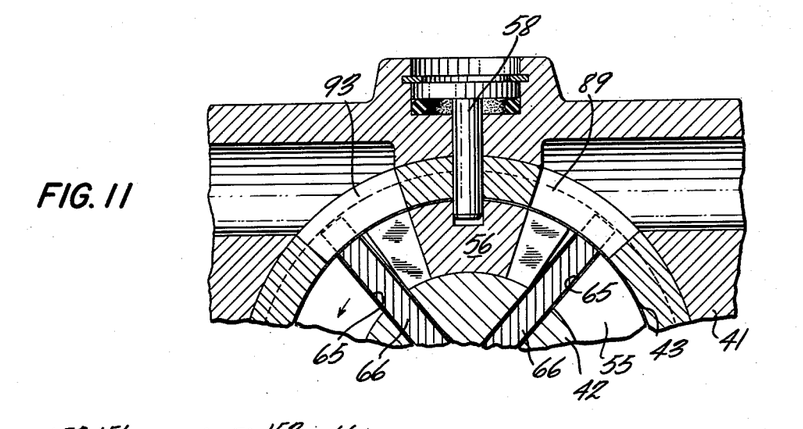
FIG. 11 is a partial front elevation view in vertical cross section, taken as indicated by the arrows 11—11 in FIG. 4, of a detail of the embodiment of FIG. 3.

This last mentioned problem is overcome in the described apparatus in the following manner. As pointed out in connection with FIGURE 5, the angular extents of the ports generally coincide with the angular intervals over which the vanes are given an axial motion. However, as discussed hitherto, the angular extent occupied by each port is somewhat greater than and extends to either side of the corresponding angular interval in which each vane is given a forward or return axial motion. Therefore, as any vane moves angularly to pass by any port, the vane will not start its axial movement until a space has opened between the vane and the first reached margin of the port, and, similarly, the axial motion of the vane will end before all the space has closed between the vane and the last reached margin of the port. This situation is represented in FIG. 11 wherein the vanes 66 which are shown therein are moving from right to left. The right-hand vane 66 is shown in the angular position where it is just starting the axial motion thereof which permits the vane to pass by reaction block 56. The left-hand vane 66 is shown in the position where it has just terminated the axial motion thereof which returns the vane from its block-passing position to its normal working position. In each case, the vane is disposed in such relation to the angular extent occupied by the adjacent port that there is unobstructed fluid pressure communication between the port and those regions of the groove 55 which lie to either side of the vane. Under the circumstances, both of the vanes of FIG. 11 will instantaneously be balanced in respect to angularly directed fluid pressure forces. Furthermore, as indicated in FIG. 11 by the start and end positions respectively occupied by the right and left-hand vanes 66 in the angular extent of the right and left-hand ports 89 and 93, any vane in passing any port will be fully within that port when both starting and terminating its axial motion. Therefore, it will be evident that the described condition of angular balance of the vane will continue throughout the axial motion thereof. It follows from this that no vane, during an axial motion thereof, will be pressed against the wall of its axial containing slot, and that the reciprocation of the vane in the slot will be made easy.

Figure 12:
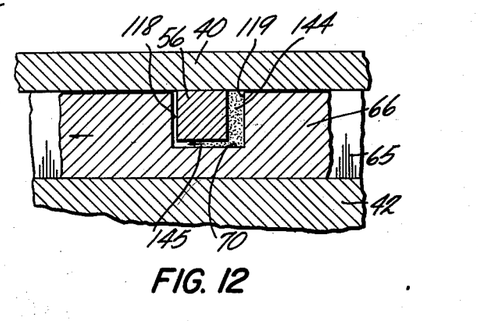
FIG. 12 is a view in side elevation and vertical cross section showing in detail the cooperation between a vane and a reaction block in the FIG. 3 embodiment.

FIGURE 12 shows another problem which has been overcome in the presently described apparatus. As a vane 66 reciprocates back and forth in its slot in order to pass by a reaction block, there is a tendency for fluid to be trapped in the space between the block and one of the side walls 118, 119 of the rectangular recess 70 in the vane. In FIGURE 12, this trapped condition of the fluid is shown in the instance where the vane 66 is in the course of passing by the block 56, the vane has just started to undergo the axial movement to the left which will return the vane from block-passing position to its normal working position, and fluid is present in the space 144 between the right-hand wall 119 of the recess 70 and the right-hand surface of the block. It is evident that the presence of this fluid in the mentioned space creates an obstruction to the fast return of the vane 66 to working position.

The difficulty just mentioned can be avoided by forming the recess 70 in vane 66 to extend radially inward of the bottom of the annular groove 55 which is formed in the drum 42. Since the bottom of the reaction block 56 cannot be disposed any further inward than the bottom of groove 55, the radial deepening of the recess 70 creates within slot 65 an axially running passageway 145 between the bottom of the reaction block and the radially inward margin of recess 70. This passageway permits flow of fluid in substantial amount from one side to the other of the reaction block. Accordingly, as the vane 66 moves to the left in the course of returning from its block-passing position to its normal working position, the fluid in the diminishing space to the right of block 56 is fluid which can freely flow out of this right-hand space, through the mentioned passageway, and into the space which is opening to the left of block 56 between the left-hand surface thereof and the receiving left-hand wall of the recess 70. Obviously, when the vane 66 is moving to the right in the course of going from its normal working position to its block-passing position, the fluid in the space to the left of block 56 can likewise flow through the mentioned passageway and around to the space which in that instance will be opening to the right of the block 56.

It will be appreciated that other means may be employed to avoid fluid trapping, as, say, one or more apertures formed in the reaction block to pass axially therethrough.

Figure 13:
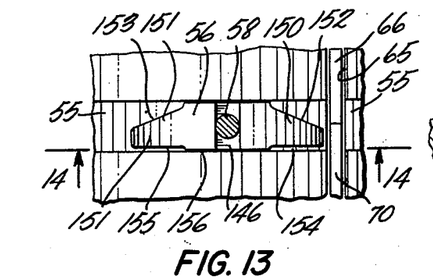
FIG. 13 is a plan view showing the details of a reaction block in the FIG. 3 embodiment.
Figure 14:
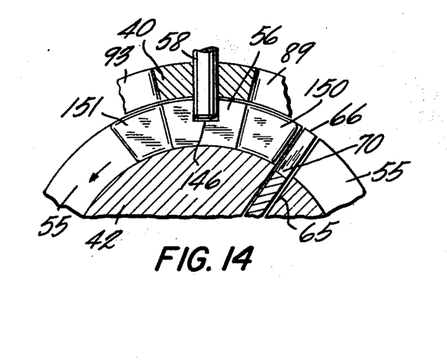
FIG. 14 is a view in front elevation and in vertical cross section, taken as indicated by the arrows 14—14 in FIG. 13 of the details of the reaction block shown in FIG. 13.

FIGURES 13 and 14 show details of the reaction blocks used in the described apparatus, and of the mode of coupling those reaction blocks to the bushing 40. As indicated by those figures, the reaction block 56 is anchored to the bushing 40 by the pin 58 which passes through an aperture in the bushing and into an axial slot 146 which is formed in the block. The pin thereby couples the block in angularly fixed relation with the bushing. At the same time, relative axial movement can take place between the pin and the axial slot 146 in which the pin rides. Hence, the reaction block 56 is adapted to move axially to thereby adjust itself to a shift in the axial position of the groove 55 relative to the bushing 40. This relative shift in axial position between groove and bushing is likely to take place in small amounts over a period of time because of wear induced in the described apparatus during continued operation thereof. Also, irrespective of wear, some shift may take place in operation because of differences in thermal expansion of various parts of the machine.

While the described pin and slot coupling provides the desired effect of self adjustment of the reaction block to slight shifts in axial position of the groove 55, an inevitable result of such type of coupling is the creation of a certain amount of play in the seating of the block in the groove 55. This play tends to get worse as the groove and block wear. Also, the block is subjected to an unbalance of angularly directed fluid pressure forces in that a high pressure port is located on one side of the block, and a low pressure port is located on the other side thereof. These two factors of play in the mounting of the block and of an unbalance of the angular pressure forces thereon are factors which, in combination, will tend to cant the block in the groove. However, such canting is prevented in the presently described apparatus by two wing-like projections 150 and 151 which extend outwardly from opposite sides of the reaction block proper and into the annular groove 55. As shown in FIG. 14, the extensions 150 and 151 are arcuately curved to fit snugly in the annular groove 55.

The extensions 150 and 151 are also shaped, as shown in FIG. 13, to respectively have the tapers 152, 153 on the sides thereof which would be to the left of FIG. 4, and to respectively have the shoulders 154, 155 on the sides thereof which would be to the right in this last-named figure. The advantages of each of these two shaped portions of each of the mentioned extensions will now be considered in turn.

It is evident that the efficiency of operation of the described apparatus can be maximized by minimizing the angular interval over which each vane is maintained axially displaced from its normal working position for the purpose of allowing the vane to pass by a reaction block. The principle just stated is true for the reason that, while the vanes are axially displaced from working position, they perform no useful work. If the described extensions of the reaction block had no tapers, the vanes, in order to pass the block, would have to be maintained fully displaced from working position over the whole angular interval occupied by the block and by its extensions. However, with the extensions being tapered as shown, the angular intervals occupied by the extensions are intervals which can and do overlap with the angular intervals over which the vanes are axially reciprocated from normal working position to block-passing position and from block-passing position back to working position. Hence, the combination of the extensions 150, 151 and the tapers thereon is a combination which enables the prevention of canting of the block with no substantial accompanying loss in the efficiency of operation of the apparatus.

While the tapering, as described, of the extensions 150, 151 solves one difficulty, it creates another in that fluid in the groove 55 will act upon the tapered areas 152, 153 with an axially directed pressure force. This force, if unopposed, will create unwanted friction between the block 56 and the wall 156 of the groove 55 towards which such axial pressure forces urge the block. This last-named difficulty is, however, avoided in the described apparatus by providing the shoulders 154, 155 which are formed in the extensions 150, 151 axially opposite the tapers 152, 153. The presence of such shoulders in the extensions 150, 151 create respective open spaces between such extensions and the mentioned wall 156 of groove 55. These open spaces receive fluid which is under pressure, and which in such spaces exerts on the extensions 150, 151 an axially directed pressure force which is equal and opposite to the axial pressure force exerted on the tapered areas 152, 153 of the extensions. In such circumstances, each extension will be balanced in respect to axial fluid pressure forces, and the block 56 will not bear with undue force against the side 156 of the groove 55.

If desired, the balance of axial pressures can be improved by forming in the extensions 150, 151 respective apertures (not shown) which axially pass through the extensions between the shoulders thereof and the tapered sides thereof.

These same apertures will preclude trapping of fluid between a vane and the reaction block as the vane reciprocates to pass by the block and to then return to working position.

Figure 15:
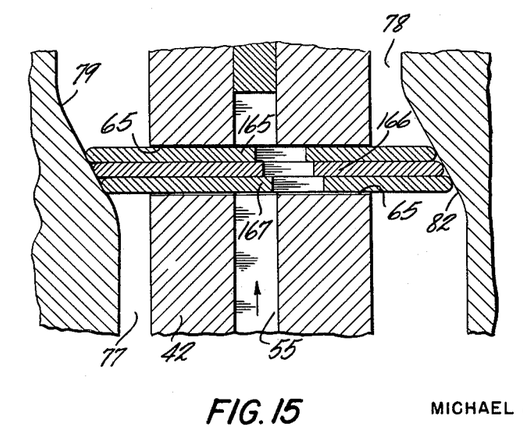
FIG. 15 is a view of a modification of the units employed as vanes in the FIG. 3 embodiment.

FIG. 15 shows a modification of the vane units 66 incorporated in the presently described apparatus. In this modification, each single vane 66 is replaced by a plurality of axially extending vane segments as, say, three segments 165, 166, 167 which are received in side by side relation within the same slot 65, and which provide a combined thickness sufficient to withstand the angular stress on the vane unit formed thereby. Each such vane segment is of the same general axial and radial shape as the vane 66 shown in FIG. 4. Moreover, each such vane segment resembles the vane 66 in that each vane segment has portions in contact with the guiding means, whereby each segment is reciprocated back and forth within the slot 65 by such guiding means. The vane unit shown in FIG. 15 differs, however, from the vane 66 of FIG. 4 in that the FIG. 15 vane unit has been subdivided into three side by side sections of which each one is movable independently of the others, and of which each one has only one-third of the mass of the vane 66 in FIG. 4.

The advantage of the modification of FIG. 16 is as follows. The force necessary to accelerate either a vane or a vane segment back and forth within the slot 65 is a force which, ignoring friction, is directly proportional to the mass of the body to be accelerated. The force which causes such acceleration is the axial component of the force exerted on the vane or vane segment by the guiding surfaces of the cam track. This driving force is not communicated from the guiding surfaces to the vane or vane segment by an areal contact, i.e., through a zone of contact of substantial extent in the angular direction as well as in the radial direction. Instead, the driving force, is communicated from a guiding surface to a vane or vane segment through a zone of contact which has substantial extent only in the radial direction, and which, hence, is known as a "line" contact.

Under those circumstances, the wear on the guiding surfaces of the cam tracks will vary directly as the axial component of force exerted by the guiding surfaces on the bodies being independently reciprocated thereby, and this force will, in turn, vary directly as the mass of the body which is reciprocated. In this view, it is clear that the replacement of a single vane by a plurality of vane segments is advantageous in that the masses of the bodies which are independently reciprocated are thereby reduced, the force required to move those bodies is correspondingly reduced, and the wear on the cam tracks and vanes is, hence, substantially lessened.

The above described embodiments being exemplary only, it will be understood that the invention hereof comprehends embodiments differing in form and/or detail from the above described embodiments.

For example, although the embodiments described herein are suitable for high speed operation, the invention hereof is applicable to rotary motion aligned impulsion machines designed for use at any speed of operation. Specific embodiments of the invention have been shown in which the cylindrical sleeve (or casing) is stationary and the drum rotates, the principles of the invention may be applied and used in machinery designed to have the sleeve (or casing) rotate while the drum remains stationary. In other modifications, the vanes may move radially in radial (instead of axial) slots, the relatively rotatable members having planar faces, one face having an annular groove and the other having the reaction block affixed thereto and seated in the groove. Such radial machine would also differ from the axial machine shown in FIGS. 3 and 4 in that the flow of fluid between the groove and the ports would be in an axial direction, the variations from dwell position of the cam guiding surfaces for imparting transverse movement to the one or more vanes would be radial rather than axial variations, and, in respect to the reaction block and vanes, what was axial in FIGS. 3 and 4 would become radial and what was radial in FIGS. 3 and 4 would become axial. As specific illustrations, in the radial machine the reaction block would project axially rather than radially from the stationary member into the annular groove of the rotor (although the extensions 150, 151 would still project angularly from the reaction block), and, in a vane of the type shown in FIG. 7, the apertures 120, 122 would run axially through the vane between axially opposite margins thereof rather than (as specifically shown in FIG. 7) radially through the vane between radially opposite margins thereof.

Accordingly, the invention is not to be considered as limited save as is consonant with the scope of the following claims.

I claim:

1. In rotary motion, aligned impulsion apparatus comprised of a pair of relatively rotatable members in the respective forms of a cylindrical drum and of a casing mounted adjacent to said drum and separated therefrom by a clearance space, one of said members having formed therein a continuous fluid-receiving groove extending thereinto from said space, reaction block means coupled in angularly fixed relation with the other of said members and seated in said groove, and vane means received within slot means formed in said one member to be in transverse relation to said groove and to extend into said one member from said clearance space, said vane means having a portion at one end of the transverse extent thereof and being adapted to move angularly relative to said reaction block means and to normally obstruct said groove by said end portion while so moving, and said vane means at the margin thereof nearest said space having formed therein a transversely central notch and being additionally adapted to undergo reciprocating movement in said slot means to pass by said reaction block means in the course of said angular movement by containing said block means within said notch, the improvement in said apparatus in which the bottom of said slot means has formed therein a recess adjacent to the margin of said vane means nearest said slot means and at the same transverse position as said groove and said vane means has formed in said last named margin a recess at the same transverse position as said notch and has also formed therein a pair of aperture means extending through said vane means from, respectively, the margin of said vane means nearest said clearance space and the said notch to, respectively, said recesses to each provide a conduit or flow of fluid through said vane means.

2. In rotary motion, aligned impulsion fluid fed apparatus comprised of a rotatable cylindrical drum and of a stationary sleeve surrounding said drum and separated therefrom by an annular, axially extending clearance space, said drum having formed therein an annular fluid-receiving groove extending radially into said drum from said clearance space, at least one reaction block coupled in angularly fixed relation with said sleeve and seated in said groove, and at least one vane received within an axial slot, formed in said drum in transverse relation to said groove, and adapted to move angularly relative to said reaction block upon rotation of said drum, said vane having a portion at one end of the axial extent thereof and said vane when so moving being normally disposed at an axial position at which said end portion obstructs the flow of fluid in said groove in the angular direction, and said vane at the margin thereof nearest said space having formed therein an axially central notch and being adapted by axial movement thereof in said slot to pass by said reaction block in the course of said angular movement by containing said block within said notch, the improvement in said apparatus in which said vane has formed therein a recess in the margin of said vane nearest said slot and at the same transverse position as said notch, and aperture extending radially through said vane from the portion of the margin of said vane nearest said clearance space which forms the bottom of said notch to said recess to provide a conduit for transmitting pressure of fluid through said vane to equalize pressure force on the two margins of the vane.

3. The improvement as in claim 2, in which said improvement further comprises another recess formed in the bottom of said slot at the same axial position as said groove and another aperture extending radially through said vane from the margin thereof nearest said clearance space to the margin thereof nearest said bottom to provide another conduit for transmitting pressure of fluid through said vane, said last named aperture being axially located in said vane to be disposed in said groove in fluid communicating relation with said last named recess when said vane is obstructing the angular flow of fluid in said groove, whereby, when said vane is in said obstructing position, said last named aperture is adapted to equalize pressure forces on the two margins of the vane.

4. In rotary motion, aligned impulsion apparatus comprised of a pair of relatively rotatable members in the respective forms of a cylindrical drum and of a casing mounted adjacent to said drum and separated therefrom by a clearance space, one of said members having formed therein a continuous fluid-receiving groove extended thereinto from said space, reaction block means coupled in angularly fixed relation with the other of said members and seated in said groove, and vane means received within slot means formed in said one member to be in transverse relation to said groove and to extend into said one member from said clearance space, said vane means having a portion at one end of the transverse extent thereof and being adapted to move angularly relative to said reaction block means and to normally obstruct said groove by said end portion while so moving, and said vane means at the margin thereof nearest said space having formed therein a transversely central notch and being additionally adapted to undergo transverse movement in said slot means to pass by said reaction block means in the course of said angular movement by containing said block means within said notch, the improvement in said apparatus in which the bottom of said slot means has formed therein a cavity at the same transverse position as said groove, said vane means has formed therein recess means at the margin of said vane means nearest the bottom of said slot means and at the same transverse position as said notch, and said vane means has also formed therein first and second fluid pressure passage means of which the first passes from said margin of said vane means nearest said space and towards the bottom of said slot means to open into said cavity when said vane means is in groove-obstructing position, and of which the second passes from said notch towards the bottom of said slot means to said recess means, said two passage means being adapted by transmission of fluid pressure to equalize the fluid pressure forces exerted on, respectively, the said margin of said vane means nearest said space and the said margin of said vane means nearest said bottom of said slot means.

5. The improvement as in claim 4 in which said vane means consists of a single vane member.

6. In rotary motion, aligned impulsion apparatus comprised of a pair of relatively rotatable members in the respective forms of a cylindrical drum and of a casing mounted adjacent to said drum and separated therefrom by a clearance space, one of said members having formed therein a continuous fluid-receiving groove extending thereinto from said space, reaction block means coupled in angularly fixed relation with the other of said members and seated in said groove, port means opening into said groove to either side of said reaction block means and vane means received within slot means formed in said one member to be in transverse relation to said groove and to extend into said one member from said clearance space, said vane means having a portion at one end of the transverse extent thereof and being adapted to move angularly relative to said reaction block means and to normally obstruct said groove by said end portion while so moving, and said vane means at the margin thereof nearest said space having formed therein a transversely central notch and being additionally adapted to undergo transverse movement in said slot means to pass by said reaction block means in the course of said angular movement by containing said block means within said notch, the improvement in said apparatus in which the bottom of said slot means has formed therein a cavity which is coextensive in transverse extent with said port means, said vane means has formed therein recess means disposed at the margin of said vane means nearest the bottom of said slot means and characterized by a transverse extent which is coextensive with that of said notch, and said vane means has also formed therein first and second fluid pressure passage means of which the first passes from said margin of said vane means nearest said space towards said bottom of said slot means to open into said cavity when said vane means is in groove-obstructing position, and of which the second passes from said notch towards the bottom of said slot means to said recess means, said passage means being adapted by transmission of fluid pressure to equalize the fluid pressure forces exerted on, respectively, the said margin of said vane means nearest said space and the said margin of said vane means nearest said bottom of said slot means.

7. The improvement as in claim 6 in which said vane means comprises a single vane member.

8. A rotary pump or motor unit comprising: a stator; a rotor mounted for rotation within the stator including a recess, forming, with a wall of the stator, a working chamber; axially slidably mounted vane means carried by the rotor; an abutment carried by the stator and extending across the working chamber; means on one side of said abutment to admit fluid into the working chamber and means on the other side of said abutment to discharge fluid from the working chamber; cam means carried by the stator to axially retract the vane means from the working chamber as it approaches said abutment and to return said vane means to the working chamber after it passes the abutment, whereby the vane means perform an operating cycle; and means rendered operable in response to the axial movement of the vane means to alternately admit and discharge fluid beneath the vane means to balance radial forces on said vane means during at least a part of the operating cycle of the vane means.

9. A rotary pump or motor unit comprising: a stator; a rotor mounted for rotation within the stator, said rotor having a recess with a bottom wall spaced from the inner wall of the stator to provide an annular working chamber; slidably mounted vane means carried by said rotor for performing an operating cycle; an abutment carried by the stator extending across said working chamber; cam means carried by the stator to retract said vane means as it approaches the abutment and to return said vane means when it passes the abutment; means to admit fluid to said working chamber on one side of the abutment and to discharge fluid therefrom on the other side of the abutment, said admission means and discharge means including arcuately extending grooves along the inner wall of said stator, tending to produce a pressure on the outer end of said vane means; and means rendered operable in response to the movement of the vane means to alternately admit and discharge fluid beneath the vane means to balance said pressure during at least a part of the operating cycle of the vane means.

10. A rotary pump or motor unit, comprising: a stator; a rotor mounted for rotation within the stator, said rotor having an annular recess with a bottom wall spaced from the inner wall of the stator to provide a working chamber, and radially extending vane receiving grooves; slidably mounted vane means mounted in said grooves, said vane means including a reaction portion and a recessed portion; an abutment carried by the stator extending across the working chamber; cam means, carried by the stator, cooperable with the vane means to shift the recessed portion into the working chamber as the vane means passes the abutment means and immediately thereafter shift the reaction surface across the working chamber to provide a working surface; means to admit working fluid to said working chamber on one side of said abutment and to discharge working fluid therefrom on the other side of the abutment; a pressure chamber below the vane means to receive fluid under pressure to urge the vane means radially outward into sealing relation with the inner stator wall; and means carried by the vane means to connect the pressure chamber with the working fluid admission and discharge means just prior to and subsequent to the rotation of the vane means past the abutment, and to seal the fluid in the pressure chamber at all other times.

11. A rotary pump or motor unit, comprising: a stator; a rotor mounted for rotation within the stator, said rotor having an annular recess with a bottom wall spaced from the inner wall of the stator to provide a working chamber, and radially extending vane receiving grooves; slidably mounted vane means mounted in said grooves, said vane means including a reaction portion and a recessed portion; an abutment carried by the stator extending across the working chamber; cam means carried by the stator, cooperable with the vane means to shift the recessed portion into the working chamber as the vane means passes the abutment means and immediately thereafter shift the reaction surface across the working chamber to provide a working surface; means to admit working fluid to said working chamber on one side of said abutment and to discharge working fluid therefrom on the other side of the abutment; a pressure chamber below the vane means to receive fluid under pressure; and means carried by the vane means to connect the pressure chamber with the working fluid admission and discharge means just prior to and subsequent to the rotation of the vane means past the abutment, and to seal the fluid in the pressure chamber at all other times.

References Cited in the file of this patent

UNITED STATES PATENTS

| 895,488 | Morehouse | Aug. 11, 1908 |
| 953,430 | Moukos | Mar. 29, 1910 |
| 1,042,696 | Lehne | Oct. 29, 1912 |
| 2,154,456 | Knapp | Apr. 18, 1939 |
| 2,154,458 | Knapp | Apr. 18, 1939 |

FOREIGN PATENTS

| 1,141,233 | France | Mar. 11, 1957 |
| 219,902 | Germany | 1907 |
| 10,518 | Great Britain | 1910 |
| 155,786 | Great Britain | Oct. 6, 1921 |
| 602,465 | Great Britain | May 27, 1948 |
| 2,234 | Netherlands | Nov. 15, 1917 |